(12) United States Patent  
Ren et al.

(10) Patent No.: US 9,216,559 B2  
(45) Date of Patent: Dec. 22, 2015

(54) METHOD FOR TRANSFERRING GRAPHENE NONDESTRUCTIVELY WITH LOW COST

(75) Inventors: Wencai Ren, Shenyang (CN); Libo Gao, Shenyang (CN); Laipeng Ma, Shenyang (CN); Huiming Cheng, Shenyang (CN)

(73) Assignee: INSTITUTE OF METAL RESEARCH CHINESE ACADEMY OF SCIENCES, Shenyang, Liaoning (CN)

( * ) Notice: Subject to any disclaimer, the term of this patent is extended or adjusted under 35 U.S.C. 154(b) by 243 days.

(21) Appl. No.: 14/124,072

(22) PCT Filed: Jun. 8, 2012

(86) PCT No.: PCT/CN2012/076622  
§ 371 (c)(1),  
(2), (4) Date: Dec. 5, 2013

(87) PCT Pub. No.: WO2012/167738  
PCT Pub. Date: Dec. 13, 2012

(65) Prior Publication Data  
US 2014/0130972 A1   May 15, 2014

(30) Foreign Application Priority Data  
Jun. 9, 2011 (CN) .......................... 2011 1 0154465

(51) Int. Cl.  
*B32B 37/14* (2006.01)  
*B32B 37/24* (2006.01)  
(Continued)

(52) U.S. Cl.  
CPC ............... *B32B 37/025* (2013.01); *B82Y 30/00* (2013.01); *B82Y 40/00* (2013.01); *C01B 31/0446* (2013.01); *C01B 31/0484* (2013.01); *C25B 1/00* (2013.01); *C25F 5/00* (2013.01); *C01B 2204/02* (2013.01)

(58) Field of Classification Search  
USPC ......................................... 156/247, 249, 701  
See application file for complete search history.

(56) References Cited

U.S. PATENT DOCUMENTS 8,822,308 B2 * 9/2014 Willner ............... H01L 21/0201  
257/E21.122  
8,877,572 B2 * 11/2014 Lee ......................... C01B 31/02  
204/194

(Continued)

FOREIGN PATENT DOCUMENTS

BE     EP 2849210 A1 * 3/2015 ............ H01L 21/187  
KR    WO 2014126298 A1 * 8/2014 ............ B01J 23/755

(Continued)

*Primary Examiner* — Sing P Chan  
(74) *Attorney, Agent, or Firm* — Novoclaims Patent Services LLC; Mei Lin Wong

(57) ABSTRACT

A method for transferring graphene nondestructively and at a low cost. In the method, a graphene is used whose surface is coated with transferring media and whose original substrate is an electrode, the electrode is placed into an electrolyte, and the graphene is separated from the original substrate by means of the driving force of bubbles and the gas intercalation produced on the graphene electrode surface during electrolysis. Then, the graphene coated with transferring media is nondestructively combined with a target substrate. The transferring media is removed so as to transfer the graphene to the target substrate nondestructively. The transferring method results in no damage or loss with respect to the graphene and the original substrate, and the original substrate can be re-used. Furthermore, the method is easy to perform, works quickly, is easy to control, and is pollution-free.

9 Claims, 7 Drawing Sheets

(51) Int. Cl.
*B32B 38/10* (2006.01)
*B32B 43/00* (2006.01)
*B32B 37/00* (2006.01)
*C25B 1/00* (2006.01)
*C01B 31/04* (2006.01)
*C25F 5/00* (2006.01)
*B82Y 30/00* (2011.01)
*B82Y 40/00* (2011.01)

(56) References Cited

U.S. PATENT DOCUMENTS

| | | | | | |
|---|---|---|---|---|---|
| 9,039,886 | B2 * | 5/2015 | Gong | | B32B 38/10 156/153 |
| 2012/0258311 | A1 * | 10/2012 | Hong | | B82Y 30/00 428/408 |
| 2014/0030857 | A1 * | 1/2014 | Lee | | C01B 31/02 438/158 |
| 2014/0037963 | A1 * | 2/2014 | Song | | C01B 31/0453 428/408 |
| 2014/0162433 | A1 * | 6/2014 | Willner | | H01L 21/0201 438/458 |
| 2014/0231270 | A1 * | 8/2014 | Loh | | C01B 31/0469 205/674 |
| 2014/0238873 | A1 * | 8/2014 | Li | | C01B 31/0484 205/644 |
| 2014/0239310 | A1 * | 8/2014 | Rho | | H01L 21/02425 257/76 |
| 2014/0332141 | A1 * | 11/2014 | Willner | | H01L 21/0201 156/79 |
| 2015/0079399 | A1 * | 3/2015 | Huyghebaert | | H01L 21/187 428/408 |
| 2015/0170906 | A1 * | 6/2015 | Redepenning | | H01L 29/24 257/29 |
| 2015/0240038 | A1 * | 8/2015 | Macedo Fechine | | C08J 5/121 428/408 |
| 2015/0266258 | A1 * | 9/2015 | Vlassiouk | | B32B 1/00 428/408 |

FOREIGN PATENT DOCUMENTS

SG WO 2013043120 A1 * 3/2013 ........... C01B 31/0469
WO WO 2014150363 A2 * 9/2014 ............ B32B 43/006

* cited by examiner

METHOD FOR TRANSFERRING GRAPHENE NONDESTRUCTIVELY WITH LOW COST

CROSS REFERENCE OF RELATED APPLICATION

This is a national phase national application of an international patent application number PCT/CN2012/076622 with a filing date of Jun. 8, 2012, which claimed priority of a foreign application number 201110154465.9 with a filing date of Jun. 9, 2011 in China. The contents of these specifications, including any intervening amendments thereto, are incorporated herein by reference.

BACKGROUND OF THE PRESENT INVENTION

1. Field of Invention

The present invention relates to a method for transferring graphene nondestructively and at low cost, and more particularly to a low cost and damage-free transferring method which utilizes the moving action and the intercalation effect of gas bubbles produced by an electrolysis process to transfer graphene from an initial substrate to a non-selective target substrate. The method is suitable for transferring monolayer or few-layer graphene on the surface of conductor or semi-conductor substrate without damage and at low cost.

2. Description of Related Arts

Graphene has a two-dimensional honeycomb crystal structure formed by a single-layer of densely packed carbon atoms, which is the basic structural unit for the construction of other digital carbon materials (such as zero-dimensional fullerenes, one-dimensional carbon nanotube and three-dimensional graphite). The unique crystal structure of graphene provides excellent electrical, thermal and mechanical properties, for examples, the electron mobility is up to 200,000 $cm^2/V \cdot s$ and the thermal conductivity is up to 5300 $W/m \cdot k$. It is possible for the graphene to be widely used in the multi-functional nanoelectronic devices, transparent conductive film, composite materials, catalytic materials, energy storage materials, field emission materials, gas sensor, gas storage materials and other fields. In order to utilize the numerous excellent characteristics of graphene, high quality graphene preparation and graphene transfer to a particular substrate becomes the important factors. Since stable graphene is first isolated by tape exfoliation method (or the micro-mechanical exfoliation method) by the research study group of the University of Manchester in 2004, many graphene preparation methods are then developed, which includes chemical exfoliation method, epitaxial growth method and chemical vapor deposition (CVD) method. In view of the relatively simple preparation process and relatively large scale of production, the graphene which is prepared by chemical exfoliation has already been widely used in composite materials, flexible transparent conductive film and energy storage electrode materials. However, because the quality of graphene obtained by chemical exfoliation is relatively poor and numerous structural defects are existed, the structural properties such as the size and the number of layer of graphene are difficult to control. The CVD and the epitaxial growth methods are the major method of preparing graphene in high quality. Through the control of preparation parameters which includes temperature, carbon source and pressure of the process, highly crystalline graphene can be grown onto many different substrate surface (metal and non-metal) and the size and number of layer of graphene can be controlled within a certain range. For graphene studies in relation to its characteristics, physical measurement and application research, the graphene is generally required to be placed on a particular substrate which is different from the substrate on which the graphene is grown. Therefore, development of graphene transfer technology for high quality graphene has very important role and significance on promoting the research of graphene materials.

At present, the two major types of graphene transfer technologies are chemical etching of substrate and direct transfer method. In view of the graphene at atomic level or with a thickness of a few nanometers, its macroscopic strength is very low and is very susceptible to damage, therefore its isolation or separation from its initial substrate without damages is the major challenge for graphene transfer. For graphene grown on surface of transition metal by CVD or epitaxial growth method, method of etching substrate can be used to solve the problem. However, because the etching method sacrifices the metal substrate, the metal materials of the substrate is consumed during the transfer process and therefore the cost of graphene preparation is increased significantly (especially for high value substrate). In addition, the steps are complicated, the process cycle is long and serious environmental pollution is caused. The method is also not suitable for transferring graphene on precious metal substrate such as rubidium (Ru) and platinum (Pt) which is highly chemically stable. For graphene grown on high value substrate, direct transfer method can be used, which is utilizing a transfer medium with stronger binding force (such as tape, adhesive and etc.) with graphene to peel off graphene directly from the substrate surface. This method does not consume any substrate materials, or utilizing chemical reagent which is corrosive or polluting. However, this method can cause damage to graphene easily and fails to realize a damage-free transfer for high quality graphene. In summary, a damage-free graphene transfer technology (damage-free for substrate materials and fro graphene) is urgently needed, which, in some extent, is critical to future development prospects of high quality graphene.

SUMMARY OF THE PRESENT INVENTION

An object of the present invention is to provide a new transferring method of graphene without causing damage to the graphene and at low cost in which the moving action and the intercalation action of bubbles generated through an electrolysis process is utilized such that graphene can be transferred from an initial substrate to a non-selective target substrate. The method does not cause damage or loss to graphene and the initial substrate while the operation process is simple, fast, easy to control and pollution-free. Accordingly, it is possible for large-scale implementation and is ideal to be used in high quality graphene transfer at a low cost.

The technical solution is further described as follows:

According to a graphene transfer method which does not induce damage to the graphene and at low cost of the present invention, the method utilizes an initial substrate having a surface on which graphene is synthesized or covered in any manner. The initial substrate is used as an electrode to undergo electrolysis through which bubbles are generated on the surface of the initial substrate to provide a combination effect of moving action and intercalation to separate the graphene on the surface from the initial substrate without damaging the graphene. Then, the graphene separated from the initial substrate, which is damage-free, can be integrated into the surface of any target substrate. In particular, the method comprises the following steps:

(1) coating of transfer medium layer: coating a transfer medium onto the initial substrate on which graphene is grown or coated to prevent damage of the graphene in the subsequent processing steps;

(2) separation the composite layer of transfer medium and graphene from the initial substrate: placing the initial substrate with the composite layer of transfer medium and graphene into a solution in which the initial substrate is an electrode, generating gaseous substances on a surface of the initial substrate by electrolysis and separating the graphene from the initial substrate through the moving action and the intercalation of the gaseous substances of which the graphene is separated without damage;

(3) binding the composite layer of transfer medium and graphene to a target substrate: placing the composite layer of transfer medium and graphene onto the target substrate through direct contact method;

(4) removing the transfer medium: removing the transfer medium coated on the outer surface of the graphene by dissolution with solvent or heating.

According to a preferred embodiment of the present invention, the graphene can be obtained by using a plurality of different methods, which includes growth of graphene by chemical vapor deposition method, epitaxial growth of graphene, growth of graphene by precipitation, (mechanical) tape exfoliation of graphene, chemical exfoliation of graphene and graphene assembly method for assembled graphene film.

According to a preferred embodiment of the present invention, high molecular weight polymer is selected as the transfer medium for providing strength protection to the graphene which prevent graphene from damages during the operation process. The high molecular weight polymer being selected includes one or more of the followings: polymethyl methacrylate (PMMA), polyethylene, polystyrene and polypropylene. The thickness of the transfer medium is 1 nm~1 mm, and preferably 20 nm~500 µm.

According to a preferred embodiment of the present invention, the graphene which is coated with the transfer medium on the initial substrate is used as the cathode or anode during the electrolysis process.

According to a preferred embodiment of the present invention, the initial substrate of graphene is a metal which includes Pt, Ni, Cu, Co, Ir, Ru, Au and Ag, a metal alloy conductor of Pt, Ni, Cu, Co, Ir, Ru, Au or Ag, a semi-conductor which includes Si, $SiO_2$, $Al_2O_3$, or a composite materials of two of the metal, the metal alloy conductor and the semiconductor.

According to the preferred embodiment of the present invention, the electrolyte solution for the electrolysis process is a single-solute electrolyte (acid, base or salt) solution, a multi-solute electrolyte solution (acid, base or salt), a mixture of single-solute electrolyte solution and organic substance (consisting one or more of alkyl, alkenyl, alkynyl, aromatic hydrocarbons, alcohols, aldehydes, carboxylic acids, esters) or a mixture of multi-solute electrolyte solution and organic substance (consisting one or more of alkyl, alkenyl, alkynyl, aromatic hydrocarbons, alcohols, aldehydes, carboxylic acids, esters). Under the specific operation conditions, select the particular electrolyte solution which will not undergo chemical or electrochemical reaction with the initial substrate.

According to the preferred embodiment of the present invention, the concentration of the electrolyte in solution is 0.01 mol/L~10 mol/L, and preferably 0.1 mol/L~4 mol/L.

According to the preferred embodiment of the present invention, the operation temperature is −10° C.~100° C., and preferably 10-50° C. during the electrolysis process.

According to the preferred embodiment of the present invention, during the electrolysis process, the voltage is 1~100 volts, preferably 2~20 volts; and the current is 0.01~100 ampere, preferably 1~10 ampere.

According to the preferred embodiment of the present invention, when organic solvent is used to remove the transfer medium of high molecular weight polymer, the organic solvent is selected from one or more of the group consisting of ketones, chlorinated hydrocarbons, halogenated hydrocarbons and aromatic hydrocarbons reagent such as acetone, ethyl lactate, ethylene dichloride, trichloroethylene and chloroform. The dissolution temperature is 0~200° C., and preferably 20~80° C.

According to the preferred embodiment of the present invention, when heating method is used to remove the transfer medium of high molecular weight polymer, the heating temperature is 50~600° C., and preferably 100~350° C.

According to a preferred embodiment of the present invention, the target substrate of graphene is a metal conductor which includes Pt, Ni, Cu, Co, Ir, Ru, Au and Ag, a semiconductor which includes Si, BN, $SiO_2$ and $Al_2O_3$, an insulator which includes glass and quartz, or a high molecular weight polymer such as polyethylene terephthalate (PET), wherein the target substrate can have any structure such as a flat surface structure, a curved surface structure or a mesh structure.

ADVANTAGEOUS EFFECT OF THE PRESENT INVENTION

1. According to the preferred embodiment of the present invention, an initial substrate and graphene with coating of transfer medium is used as the electrode and placed in the electrolyte solution for carrying out an electrolysis process. Through the electrolysis process, gas substance is produced on the surface of the electrode. Under the moving action and intercalation action of the gas substance, the graphene is separated from the initial substrate without damages.

2. According to the preferred embodiment of the present invention, a common high molecular transfer medium is used as the transfer medium for the graphene, which is cheap and durable, and easy to remove after the transfer process.

3. According to the preferred embodiment of the present invention, a constant voltage or a constant current power supply is used. The voltage is 5 volts under constant voltage condition, the current is 1 ampere under the constant current condition, and the time of electrolysis is usually within a few minutes. Accordingly, the cycle of the transfer process is short and the energy consumption is low.

4. According to the preferred embodiment of the present invention, the initial substrate and the graphene are used solely as the electrode for electrolysis and the electrolyte solution being selected will not have any corrosive effect, therefore no damage is induced to the initial substrate and the graphene. The initial substrate can be re-used for many times or unlimited number of times. Accordingly, the cost is decreased dramatically and no environment pollution is caused.

5. According to the preferred embodiment of the present invention, the operation process is simple and easy. Compared to graphene transfer method by etching the substrate, the method of the present invention can realize a low cost and rapid transfer method in large scale for graphene transfer.

In conclusion, the graphene which is grown or coated onto an initial substrate is protected by the transfer medium and is capable of being transfer to any target substrate without damage through the moving action and the intercalation action of the gas bubbles produced by the electrolysis process. Accordingly, the high quality of the graphene can be maintained. Also, the substrate can be re-used for many times or unlimited number of times, therefore the material loss of the substrate is decreased significantly and this method is particularly suitable for transferring graphene which is grown on a metal substrate. In addition, the transfer time is rapid and the level of environmental pollution is low, therefore providing support to the large scale application of graphene in transparent conductive film, nanoelectronic devices and etc.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 2 shows that no damage and destruction effect is caused by the transfer process of the present invention.

FIG. 3 show that no damage and destruction effect is caused to the monocrystalline graphene by the transfer process of the present invention.

FIG. 4 shows that the transfer process of the present invention is also applicable to substrate with uneven structure, such as the substrate with groove structures and electrode.

FIG. 6 shows no significant changes on the surface of the substrate, which indicates that the substrate can be used repeatedly after the transfer process of the present invention.

DETAILED DESCRIPTION OF THE PREFERRED EMBODIMENT

Figure 1:
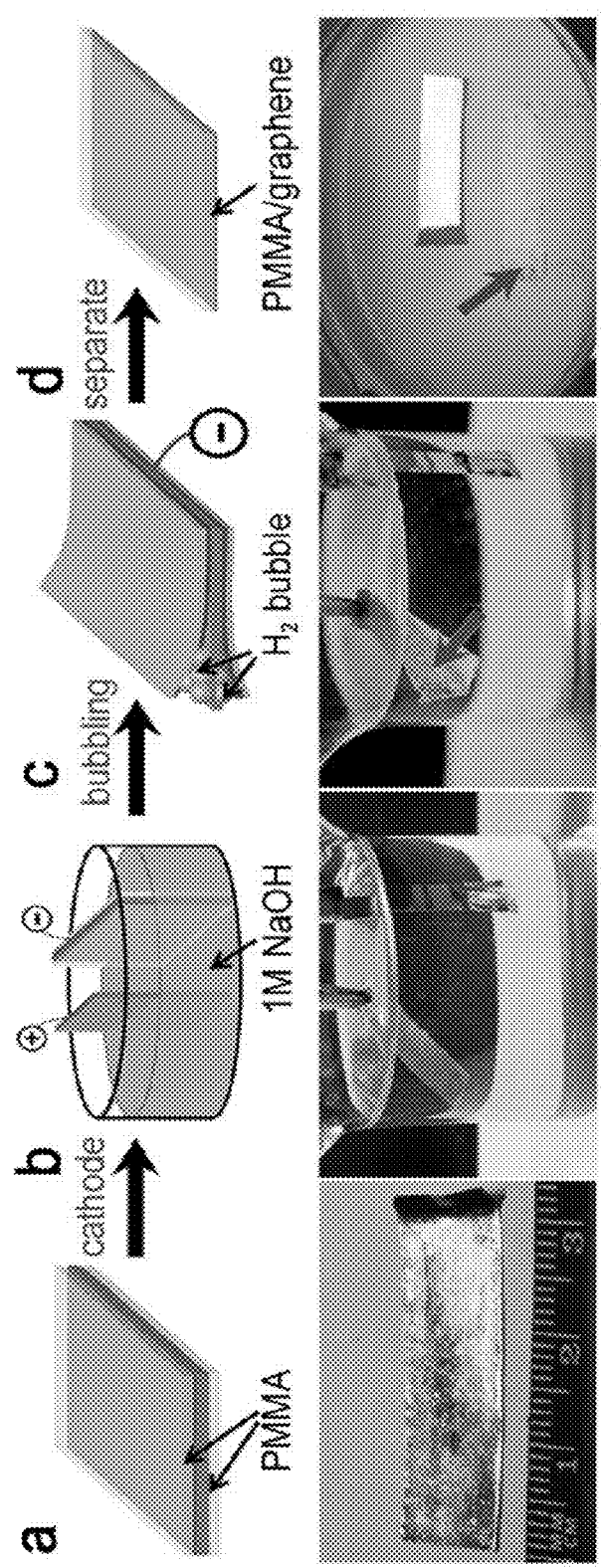
FIG. 1 is an illustration of a damage-free graphene transfer process which separate the graphene from its initial substrate according to a preferred embodiment of the present invention, wherein (a) illustrates the PMMA layer coating on the platinum foil of which the graphene is grown or covered on the surface; (b) illustrates the PMMA/graphene/platinum foil serving as a cathode and another platinum foil serving as an anode in an electrolytic cell; (c) illustrates the action of the hydrogen gas produced by the electrolyte solution under the current of 1 ampere through which the composite layer of PMMA and graphene is stripped off from the platinum foil, which serves as the metal substrate; and (d) illustrates that the composite layer of PMMA and graphene and the platinum foil are separated completely after bubbling for tens of seconds. In the drawings, the arrow points to the composite layer of PMMA and graphene.

According to a graphene transfer method which does not induce damage to the graphene and at low cost of the present invention, the method utilizes an initial substrate having a surface on which graphene is synthesized or covered in any manner. The initial substrate is used as an electrode to undergo electrolysis through which bubbles are generated on the surface of the initial substrate to provide a combination effect of moving action and intercalation to separate the graphene on the surface from the initial substrate without damaging the graphene. Then, the graphene separated from the initial substrate, which is damage-free, can be integrated into the surface of any target substrate. In particular, the method comprises the following steps:

(1) coating of transfer medium layer: coating a transfer medium onto the initial substrate on which graphene is grown or coated to prevent damage of the graphene in the subsequent processing steps;

(2) separation the composite layer of transfer medium and graphene from the initial substrate: placing the initial substrate with the composite layer of transfer medium and graphene into a solution in which the initial substrate is an electrode, generating gaseous substances on a surface of the initial substrate by electrolysis and separating the graphene from the initial substrate through the moving action and the intercalation of the gaseous substances of which the graphene is separated without damage;

(3) binding the composite layer of transfer medium and graphene to a target substrate: placing the composite layer of transfer medium and graphene onto the target substrate through direct contact method;

(4) removing the transfer medium: removing the transfer medium coated on the outer surface of the graphene by dissolution with solvent or heating.

Embodiment 1

Obtain graphene by growing the graphene on platinum foil using Chemical vapor deposition (CVD) method. (Please refer to Gao, L. B.; Ren, W. C.; Zhao, J. P.; Ma, L. P.; Chen, Z. P.; Cheng, H. M. Efficient growth of high-quality graphene films on Cu foils by ambient pressure chemical vapor deposition. *Appl. Phys. Lett.* 2010, 97, 183109 for details of the CVD method.) After the platinum foil on which the graphene is grown is cooled, coating a layer of PMMA (PMMA dissolved in ethyl lactate, concentration of PMMA is 4 wt. %) onto one side of the platinum foil by using spin coater device with a spin speed of 2000 rpm and a spin time of 1 minute. Place the platinum foil into an oven at 180° C. for 30 minutes and take out the platinum foil for cooling under room condition. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the solution, apply a current at 1 ampere, a voltage at 8~16 volts and an operation temperature at 30-40° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. The time required for stripping off the composite layer of PMMA and graphene will be affected by the roughness, size and other factors of the surface of the platinum foil and therefore the actual time required is based on the separation condition of the platinum foil and the composite layer of PMMA and graphene. In general, a platinum foil with PMMA and graphene composite layer which has a size of 1 cm×3 cm will require a time period of 30 seconds to 1 minute. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water. Place the separated composite layer of PMMA and graphene under low-temperature heating device or heat lamp (50~80° C.) for 30 minutes or above to remove any water residue. Then position the separated composite layer of PMMA and graphene onto the surface of a target substrate, which is a pre-cut target substrate such as $Si/SiO_2$, $Si/Al_2O_3$, BN, PET, glass, copper mesh and the etc. Lastly, use acetone to dissolve the PMMA for a time period of at least 10 minutes.

The graphene which is transferred to the target substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 2

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto both sides of the platinum foil (in this embodiment, both two sides of the platinum foil are coated with PMMA) by using spin coater device with a spin speed of 2000 rpm and a spin time of 1 minute. Place the platinum foil into an oven at 180° C. for 30 minutes and take out the platinum foil for cooling under room condition. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is NaOH solution having a concentration of 0.1~4 mol/L. After the platinum foil with PMMA and graphene layer is completely immersed into the solution, apply a current at 1 ampere (the current is 0.1~4 ampere for the electrolysis process according to this embodiment), a voltage at 8~16 volts and an operation temperature at 20-30° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely (the time for the electrolysis process is 20 seconds to 30 minutes according to this embodiment), remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 3

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. The electrolyte is 1 mol/L NaOH solution (According to this embodiment, the electrolyte can be different alkali, acid or salt solution such as KOH, H2SO4, Na2SO4 and etc. having a concentration of 0.1~5 mol/L). After the platinum foil with PMMA and graphene layer is completely immersed into the solution, apply a current at 1 ampere (the current is 0.1~4 ampere for the electrolysis process according to this embodiment), a voltage at 8~16 volts and an operation temperature at 30-40° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely (the time for the electrolysis process is 60 seconds to 60 minutes according to this embodiment), remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 4

The differences between this embodiment and the embodiment 1 is as follows:

According to this embodiment, obtain graphene by growing the graphene on monocrystalline platinum foil using Chemical vapor deposition (CVD) method (According to this embodiment, platinum foil can be replaced by platinum plate or platinum foil of different specification, monocrystalline or polycrystalline, with a thickness greater than 10 μm). After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 5

The differences between this embodiment and the embodiment 1 is as follows:

According to this embodiment, obtain graphene by growing the graphene on different metal using a different method (According to this embodiment, platinum foil can be replaced by metal foil of different element such as ruthenium, iridium, nickel, copper and etc., or by metal film binding and stabilized on a silicone sheet). After the metal foil or metal film on which the graphene is grown is cooled, coating a layer of PMMA onto one side of the metal foil or metal film by using spin coater device. The thickness of the transfer medium is 500~1000 nm. The metal foil or metal film with PMMA and graphene layer is used as a cathode and connected to a negative electrode of a constant current power supply, and a platinum foil is used as an anode and connected to a positive electrode of the power supply. According to this embodiment, the electrolyte is 1 mol/L NaOH solution (According to this embodiment, the electrolyte can be replaced by an alkali, acid or salt solution which is not likely to corrode the particular metal used in the electrode). After the metal foil or the metal film with PMMA and graphene layer is completely immersed into the solution, apply a current at 1 ampere, a voltage at 8~16 volts and an operation temperature at 30-40° C. for carrying out an electrolysis process. During the electrolysis process, the metal foil or the metal film with PMMA and graphene which is connected to the negative electrode of the power supply will generate hydrogen gas ($H_2$). Under the moving action and intercalation action of the hydrogen gas, the composite layer of PMMA and graphene is stripped off gradually from the metal foil or the metal film. After the composite layer of PMMA and graphene is separated from the metal foil or the metal film completely, remove the metal foil or the silicone sheet with metal film and the separated composite layer of PMMA and graphene from the solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 6

The differences between this embodiment and the embodiment 1 is as follows:

According to this embodiment, prepare the graphene on different semi-conductor substrate by using a different method (According to this embodiment, metal substrate can be replaced by semi-conductor substrate such as SiC). After the semi-conductor substrate on which the graphene is grown is cooled, coating a layer of PMMA onto one side of the semi-conductor substrate by using spin coater device. The thickness of the transfer medium is 500~1000 nm. The semi-conductor substrate with PMMA and graphene layer is used as a cathode and connected to a negative electrode of a constant current power supply, and a platinum foil is used as an anode and connected to a positive electrode of the power supply. The electrolyte is 1 mol/L $H_2SO_4$ solution (According to this embodiment, the electrolyte can be replaced by an acid or salt solution which is not likely to corrode the substrate being used). After the semi-conductor substrate with PMMA and graphene layer is completely immersed into the solution, apply a current at 1 ampere, a voltage at 8~16 volts and an operation temperature at 20-30° C. for carrying out an electrolysis process. During the electrolysis process, the semi-conductor substrate with PMMA and graphene which is connected to the negative electrode of the power supply will generate hydrogen gas ($H_2$). Under the moving action and intercalation action of the hydrogen gas, the composite layer of PMMA and graphene is stripped off gradually from the semi-conductor substrate. After the composite layer of PMMA and graphene is separated from the semi-conductor substrate completely, remove the semi-conductor substrate and the separated composite layer of PMMA and graphene from the solution and put into purified water. After rinsing the separated composite layer of PMMA and graphene for many times and for a long predetermined period of time, remove the separated composite layer of PMMA and graphene from the purified water by using a silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 7

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. The electrolyte is 1 mol/L NaOH solution. After the platinum foil with PMMA and graphene layer is partially immersed into the solution (according to this embodiment, during the electrolysis process, the platinum foil with PMMA and graphene layer is immersed slowly into the solution, and the time is the same as the time required for separation of the platinum foil and the composite layer of PMMA and graphene), apply a current at 1 ampere, a voltage at 8~16 volts and an operation temperature at 10-20° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 8

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of transfer medium (According to this embodiment, photoresists, PDMS, metal film and etc. which is easy for film formation, having strong binding properties with substrate, and easy to remove can be used as the transfer medium.) onto one side of the platinum foil by using spin coater device and drying. The thickness of the transfer medium is 500-1000 nm. The platinum foil with transfer medium and graphene layer is used as a cathode and connected to a negative electrode of a constant current power supply, and another platinum foil is used as an anode and connected to a positive electrode of the power supply. The electrolyte is 1 mol/L NaOH solution (According to this embodiment, the electrolyte which does not have harmful effect on the transfer medium is used). After the platinum foil with transfer medium and graphene layer is partially immersed into the solution, apply a current at 1 ampere, a voltage at 8~16 volts and an operation temperature at 20-30° C. for carrying out an electrolysis process. During the electrolysis process, the platinum foil with transfer medium and graphene layer which is connected to the negative electrode of the power supply will generate hydrogen gas ($H_2$). Under the moving action and intercalation action of the hydrogen gas, the composite layer of transfer medium and graphene is stripped off gradually from the platinum foil. After the composite layer of transfer medium and graphene is separated from the platinum foil completely, remove the platinum foil and the separated composite layer of transfer medium and graphene from the NaOH solution and put into purified water. After rinsing the separated composite layer of transfer medium and graphene for many times and for a long predetermined period of time, remove the separated composite layer of transfer medium and graphene from the purified water by using silicon sheet and oven dry the separated composite layer of transfer medium and graphene. Position the separated composite layer of transfer medium and graphene onto the surface of the silicon sheet and then remove the transfer medium.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 9

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device and oven drying. The thickness of the transfer medium is 500~1000 nm. The platinum foil with PMMA and graphene layer is used as an anode and connected to a positive electrode of a constant current power supply, and another platinum foil is used as a cathode and connected to a negative electrode of the power supply. The electrolyte is 1 mol/L particular electrolyte solution (According to this embodiment, the particular electrolyte solution which does not produce oxygen in the anode is used. For examples, NaCl or HCl can be used as the electrolyte solution.). After the platinum foil with PMMA and graphene layer is completely immersed into the solution, apply a current at 1 ampere, a voltage at 8~16 volts and an operation temperature at 30-40° C. for carrying out an electrolysis process. During the electrolysis process, the platinum foil with PMMA and graphene which is connected to the positive electrode of the power supply will generate chlorine gas ($Cl_2$). Under the moving action and intercalation action of the chlorine gas, the composite layer of PMMA and graphene is stripped off gradually from the platinum foil. After the composite layer of PMMA and graphene is separated from the platinum foil completely, remove the platinum foil and the separated composite layer of PMMA and graphene from the electrolyte solution and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 10

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device and oven drying. The thickness of the transfer medium is 500~1000 nm. Using two platinum foils with PMMA and graphene layer to connect to a positive and a negative electrode of a constant current power supply respectively. The electrolyte is 1 mol/L particular electrolyte solution (According to this embodiment, the particular electrolyte solution which does not produce oxygen in the anode is used. For examples, NaCl or HCl can be used as the electrolyte solution.). After the platinum foil with PMMA and graphene layer is partially immersed into the solution, apply a current at 1 ampere, a voltage at 8~16 volts and an operation temperature at 50-60° C. for carrying out an electrolysis process. During the electrolysis process, the two platinum foils with PMMA and graphene which are connected to the positive electrode and the negative electrode of the power supply will produce chlorine gas ($Cl_2$) and hydrogen gas ($H_2$) respectively. Under the moving action and intercalation action of the chlorine gas and hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the electrolyte solution (According to this embodiment, both of the two electrodes are used to separate the composite layer of PMMA and graphene from the platinum foil.) and put into purified water. After rinsing the separated composite layer of PMMA and graphene for many times and for a long predetermined period of time, remove the separated composite layer of PMMA and graphene from the purified water by using silicon sheet and oven dry the separated composite layer of PMMA and graphene. Position the separated composite layer of PMMA and graphene onto the surface of the silicon sheet and then dissolve the PMMA by acetone.

The graphene on the silicon sheet is then observed. The surface layer distribution, uniformity and damage level are observed under an optical microscope, the micro-cracking and folding are observed through atomic force microscopy, and the quality of crystalline graphene is determined through Raman spectroscopy.

Embodiment 11

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a target substrate, which is a pre-cut target substrate (According to this embodiment, the target substrate is a glass substrate). Place the separated composite layer of PMMA and graphene under low-temperature heating device or heat lamp (50~80° C.) for 30 minutes or above to remove any water residue. Then, place the separated composite layer of PMMA and graphene under high-temperature heating device (100~180° C.) for 30 minutes or above. Position the separated composite layer of PMMA and graphene onto the surface of the glass substrate. Lastly, use acetone to dissolve the PMMA for a time period of at least 10 minutes.

The graphene on the glass substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 12

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will produce hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a target substrate, which is a pre-cut target substrate (According to this embodiment, the target substrate is a PET substrate). Place the separated composite layer of PMMA and graphene under low-temperature heating device or heat lamp (50~80° C.) for 30 minutes or above to remove any water residue. Position the separated composite layer of PMMA and graphene onto the surface of the PET substrate. Lastly, use acetone to dissolve the PMMA for a time period of at least 10 minutes.

The graphene on the PET substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 13

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will generate hydrogen gas ($H_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a target substrate, which is a pre-cut target substrate (According to this embodiment, the target substrate is few-layer hexagonal boron nitride (BN)/SiO$_2$/Si substrate). Place the separated composite layer of PMMA and graphene under low-temperature heating device or heat lamp (50~80° C.) for 30 minutes or above to remove any water residue. Then, place the separated composite layer of PMMA and graphene under high-temperature heating device (100~180° C.) for 30 minutes or above. Position the separated composite layer of PMMA and graphene onto the surface of the BN substrate. Lastly, use acetone to dissolve the PMMA for a time period of at least 10 minutes.

The graphene on the BN/SiO$_2$/Si substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 14

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will produce hydrogen gas (H$_2$). Under the moving action and intercalation action of the hydrogen gas, the composite layer of PMMA and graphene is stripped off gradually from the platinum foil. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a target substrate, which is a pre-cut target substrate (According to this embodiment, the target substrate is micro-film copper mesh grid substrate with 200 mesh). Place the separated composite layer of PMMA and graphene under low-temperature heating device or heat lamp (50~80° C.) for 30 minutes or above to remove any water residue. Then, place the separated composite layer of PMMA and graphene under high-temperature heating device (100~180° C.) for 30 minutes or above. Position the separated composite layer of PMMA and graphene onto the surface of the micro-film copper mesh grid substrate. Lastly, use acetone to dissolve the PMMA for a time period of at least 10 minutes.

The graphene on the micro-film copper mesh grid substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 15

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will produce hydrogen gas (H$_2$). Under the moving action and intercalation action of the hydrogen gas, the composite layer of PMMA and graphene is stripped off from the platinum foil gradually. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a target substrate, which is a pre-cut target substrate (According to this embodiment, the target substrate is SiO$_2$/Si substrate with channels on its surface). Place the separated composite layer of PMMA and graphene under low-temperature heating device or heat lamp (50~80° C.) for 30 minutes or above to remove any water residue. Then, place the separated composite layer of PMMA and graphene under high-temperature heating device (100~180° C.) for 30 minutes or above. Position the separated composite layer of PMMA and graphene onto the surface of the SiO$_2$/Si substrate. Lastly, use acetone to dissolve the PMMA for a time period of at least 10 minutes.

The graphene on the SiO$_2$/Si substrate is then observed. The surface layer distribution, uniformity and damage level are observed under an optical microscope, the micro-cracking and folding are observed through atomic force microscopy, and the quality of crystalline graphene is determined through Raman spectroscopy.

Embodiment 16

The differences between this embodiment and the embodiment 1 is as follows:

According to this embodiment, obtain graphene by growing the graphene on platinum foil using Chemical vapor deposition (CVD) method. After the platinum foil on which the graphene is grown is cooled, coating a layer of PMMA onto one side of the platinum foil by using spin coater device. The thickness of the transfer medium is 500~1000 nm. The platinum foil with PMMA and graphene layer is used as a cathode and connected to a negative electrode of a constant current power supply, and another platinum foil is used as an anode and connected to a positive electrode of the power supply. According to this embodiment, the electrolyte is 1 mol/L NaOH solution. After the platinum foil with PMMA and graphene layer is completely immersed into the NaOH solution, apply a current at 1 ampere, a voltage at 8~16 volts and an operation temperature at 40-50° C. for carrying out an electrolysis process. During the electrolysis process, the platinum foil with PMMA and graphene which is connected to the negative electrode of the power supply will produce hydrogen gas ($H_2$). Under the moving action and intercalation action of the hydrogen gas, the composite layer of PMMA and graphene is stripped off from the platinum foil gradually. After the composite layer of PMMA and graphene is separated from the platinum foil completely, remove the platinum foil and the separated composite layer of PMMA and graphene from the NaOH solution and put into purified water. After rinsing the separated composite layer of PMMA and graphene for many times and for a long predetermined period of time, remove the separated composite layer of PMMA and graphene from the purified water by using a pre-cut copper substrate (According to this embodiment, a metal substrate such as silver, aluminum, and etc. substrate having a thickness of 1 μm~1 mm can be used.). Place the separated composite layer of PMMA and graphene under low-temperature heating device or heat lamp (50~80° C.) for 30 minutes or above to remove any water residue. Then, place the separated composite layer of PMMA and graphene under high-temperature heating device (100~180° C.) for 30 minutes or above. Position the separated composite layer of PMMA and graphene onto the surface of the copper substrate. Lastly, use acetone to dissolve the PMMA for a time period of at least 10 minutes.

The graphene on the copper substrate is then observed. The surface layer distribution, uniformity and damage level are observed under an optical microscope, the micro-cracking and folding are observed through atomic force microscopy, and the quality of crystalline graphene is determined through Raman spectroscopy.

Referring to FIG. 1 of the drawings in which a flow chart of a damage-free graphene transfer process which separate the graphene from a platinum foil is illustrated, wherein (a) illustrates the PMMA layer coating on the platinum foil of which the graphene is grown or covered on the surface; (b) illustrates the PMMA/graphene/platinum foil serving as a cathode and another platinum foil serving as an anode in an electrolytic cell; (c) illustrates the action of the hydrogen gas produced by the electrolyte solution under the current of 1 ampere through which the PMMA/graphene is stripped off from the platinum foil, which serves as the metal substrate; and (d) illustrates that the PMMA/graphene and the platinum foil are separated completely after bubbling for tens of seconds. In the drawings, the arrow points to the PMMA/graphene layer (the composite layer of PMMA and graphene).

Figure 2:
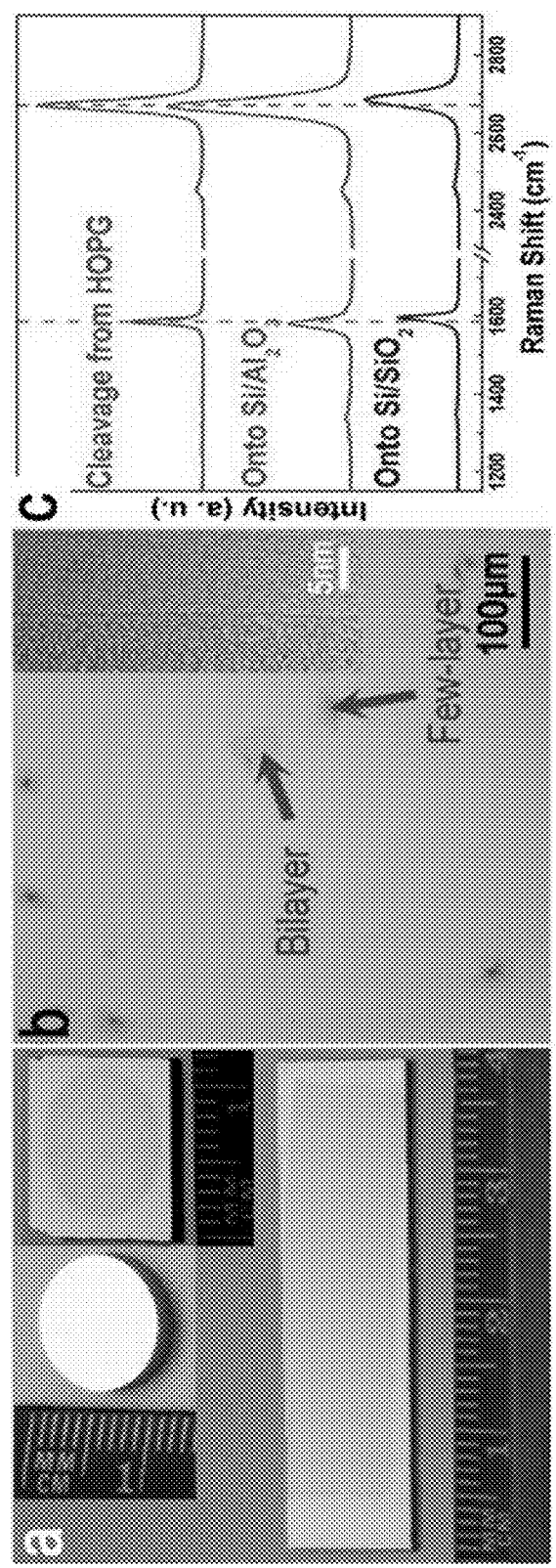
FIG. 2 is an illustration of a graphene film which is transferred from a platinum foil, wherein (a) is the optical photo of the graphene which is transferred to Si/SiO$_2$ substrate, the illustration (on the left) shows a monocrystalline Pt (111) substrate on which graphene is grown and the illustration (on the right) shows the graphene film which is transferred from the Pt(111) substrate onto the Si/SiO$_2$; (b) is the optical micrographs of the graphene which is transferred onto the surface of Si/SiO$_2$ substrate, which shows that the majority of graphene is monolayer and a small area is double-layer or few-layer, the illustration is a TEM photo showing the boundary of the monolayer graphene; (c) Raman spectra comparison for the monolayer graphene: the graphene obtained by tape exfoliation method and the graphene removed by the damage-free transfer method of the present invention in which the Si/SiO$_2$ and the Si/Al$_2$O$_3$ are used as the target substrate are illustrated. The weak D mode confirms that the graphene is of high quality after the transfer method of the present invention.

Referring to FIG. 2 of the drawings, (a) is the optical photo of the graphene which is transferred to $Si/SiO_2$ substrate, the illustration (on the left) shows a monocrystalline Pt (111) substrate on which graphene is grown and the illustration (on the right) shows the graphene film which is transferred from the Pt(111) substrate onto the $Si/SiO_2$; (b) is the optical micrographs of the graphene which is transferred onto the surface of $Si/SiO_2$ substrate, which shows that the majority of graphene is monolayer and a small area is double-layer or few-layer, and the illustration provides a TEM photo which shows the boundary of the monolayer graphene; and (c) is the Raman spectra comparison of the monolayer graphene: the graphene obtained by tape exfoliation method and the graphene removed by the damage-free transfer method of the present invention in which the $Si/SiO_2$ and the $Si/Al_2O_3$ are used as the target substrate are illustrated. The weak D mode confirms that the graphene is of high quality after the transfer method of the present invention. FIG. 2 shows that no damage and destruction effect is caused by the transfer process of the present invention. The graphene film does not show any significant damage after the damage-free transfer method of the present invention and appears to have a higher crystal quality, therefore the damage-free transfer method of the present invention is proved to be damage-free to the graphene.

Figure 3:
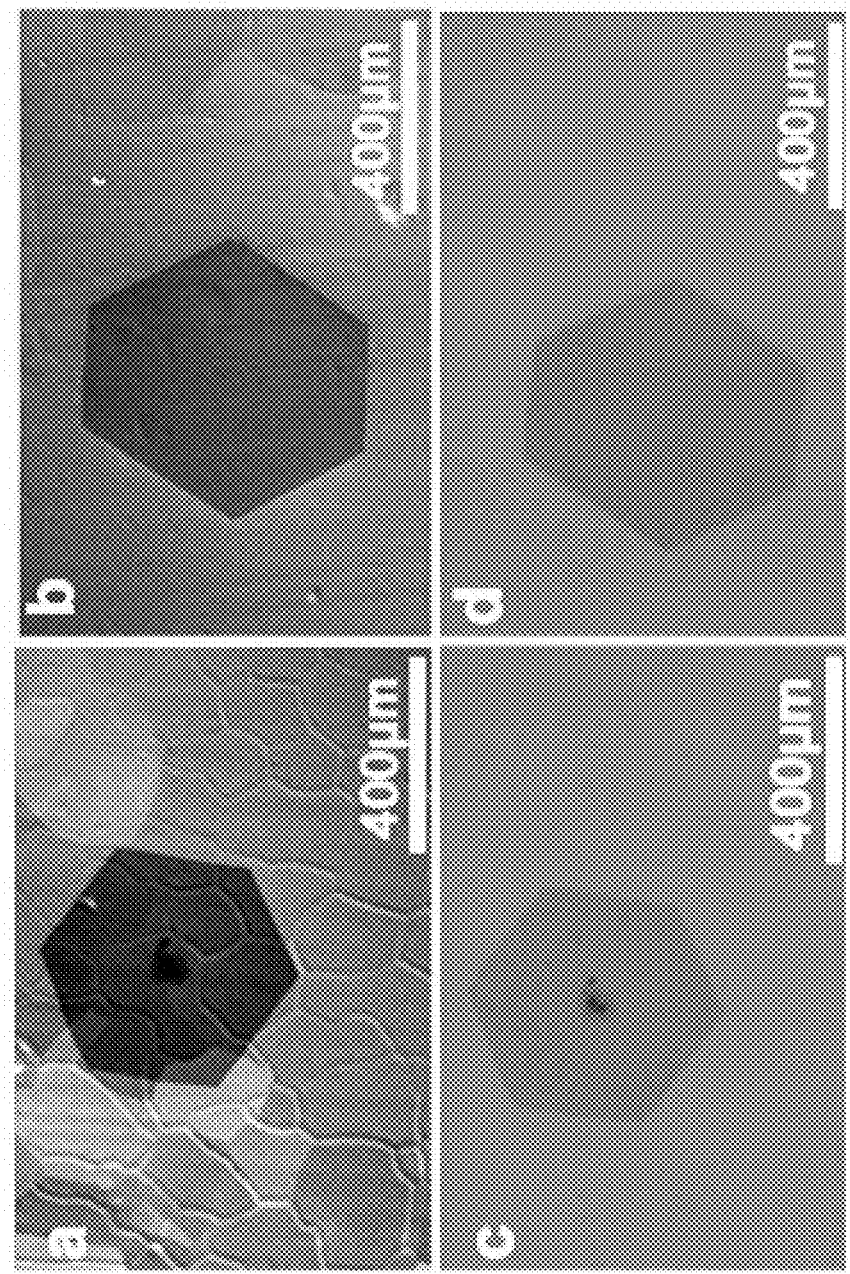
FIG. 3 is an illustration of the structural feature of monocrystalline graphene which is grow on a platinum foil before and after the damage-free graphene transfer process, wherein (a-b) are the SEM of the monocrystalline graphene grown on a platinum foil; (c-d) are the optical photos of the monocrystalline graphene transferred to the Si/SiO$_2$ substrate.

Referring to FIG. 3 of the drawings, (a-b) are the SEM of the monocrystalline graphene grown on a platinum foil; and (c-d) are the optical photos of the monocrystalline graphene transferred to the $Si/SiO_2$ substrate. FIG. 3 shows that no damage and destruction effect is caused to the monocrystalline graphene by the transfer process of the present invention.

Figure 4:
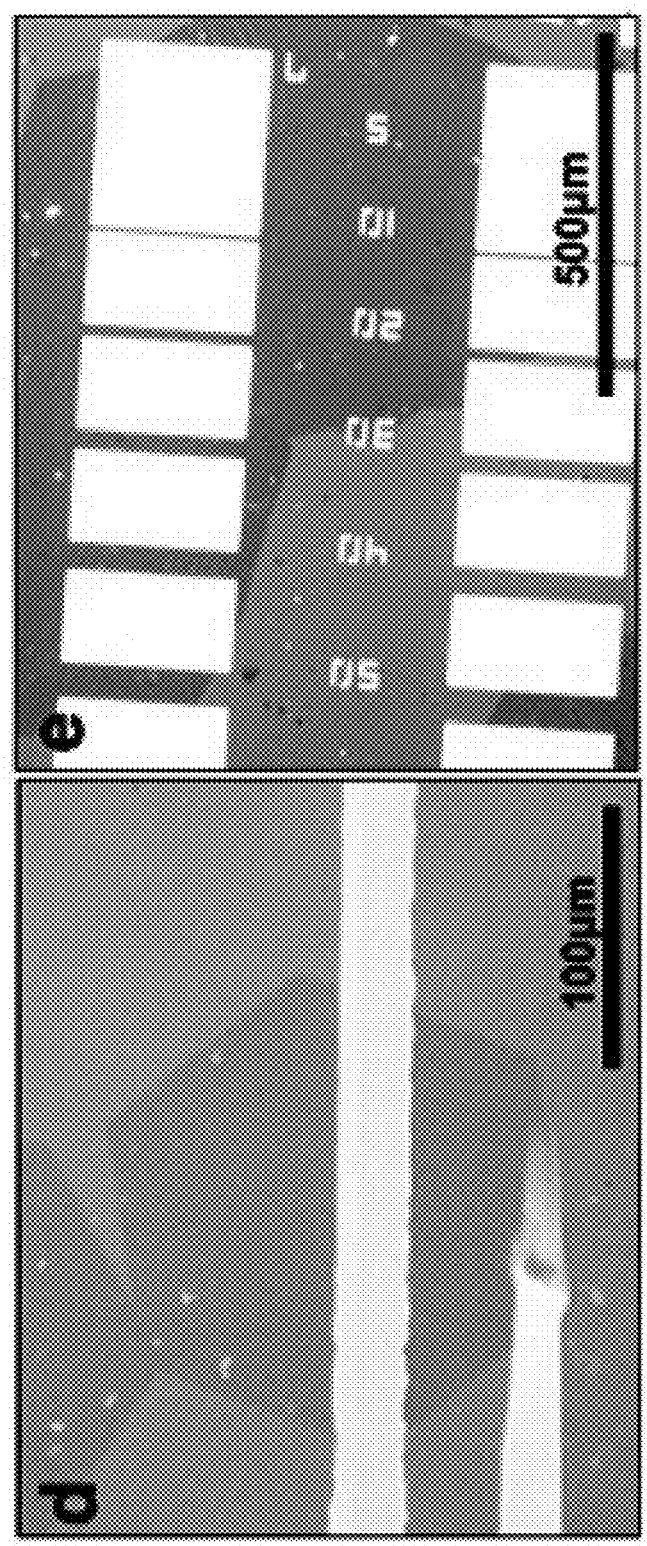
FIG. 4 is an illustration of transferring monocrystalline graphene which is grow on a platinum foil to different substrates by the damage-free graphene transfer process of the present invention, wherein (d) illustrates the optical photo of the monocrystalline graphene transferred to the Si/SiO$_2$ substrate on which a plurality of grooves structure is constructed; and (e) illustrates the optical photo of the monocrystalline graphene transferred to the Si/SiO$_2$ substrate on which Au electrode is provided.

Referring to FIG. 4 of the drawings, (d) illustrates the optical photo of the monocrystalline graphene transferred to the $Si/SiO_2$ substrate on which a plurality of grooves structure is constructed; and (e) illustrates the optical photo of the monocrystalline graphene transferred to the Au electrode on a $Si/SiO_2$ substrate. FIG. 4 shows that the transfer process of the present invention is also applicable to substrate with uneven structure, such as the substrate with groove structures and electrode.

Figure 5:
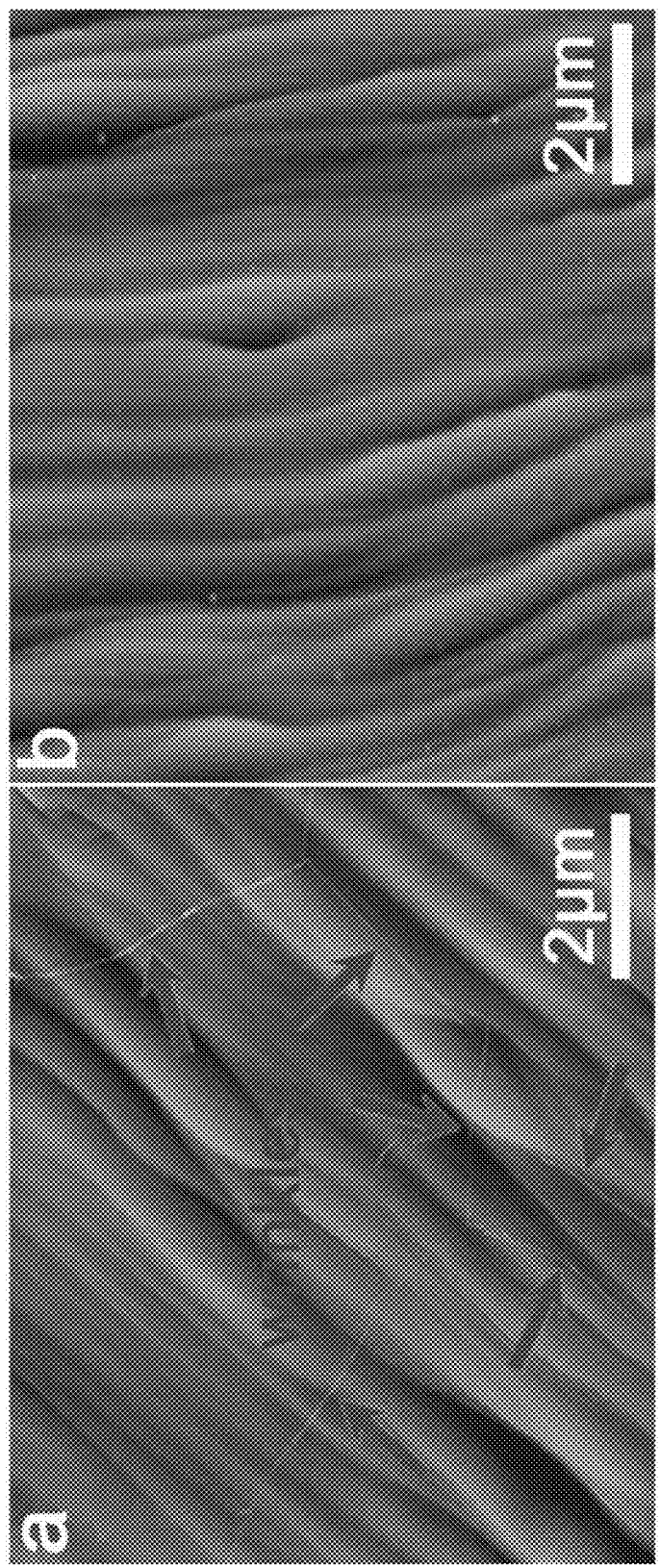
FIG. 5 is an illustration to show the changes in the surface of substrate before and after the damage-free graphene transfer process, wherein (a) is the AFM of the monocrystalline Pt(111) surface on which graphene is grown, the folding (the wrinkles) shows the existence of graphene; and (b) is the AFM of the Pt(111) surface after the transfer process of the present invention in which the original structure of the Pt(111) surface at atomic level, where no wrinkles caused by the graphene and the original appearance and structure of the Pt(III) is maintained after the transfer process of the present invention are shown.

Referring to FIG. 5 of the drawings, (a) is the AFM of the monocrystalline Pt(111) surface on which graphene is grown, the folding (the wrinkles) shows the existence of graphene; and (b) is the AFM of the Pt(111) surface after the transfer process of the present invention, which shows that only the original structure of the Pt(111) surface at atomic level is left, no graphene wrinkles is presented, and the original appearance and structure of the Pt(III) is maintained after the transfer process of the present invention. Compare the surface of monocrystalline platinum before and after the damage-free transfer process of the present invention, no graphene residue is left on the surface of the platinum, and no changes is observed in the structure of the platinum at atomic level, therefore the damage-free transfer method of the present invention is proved to be damage-free to the platinum substrate.

Figure 6:
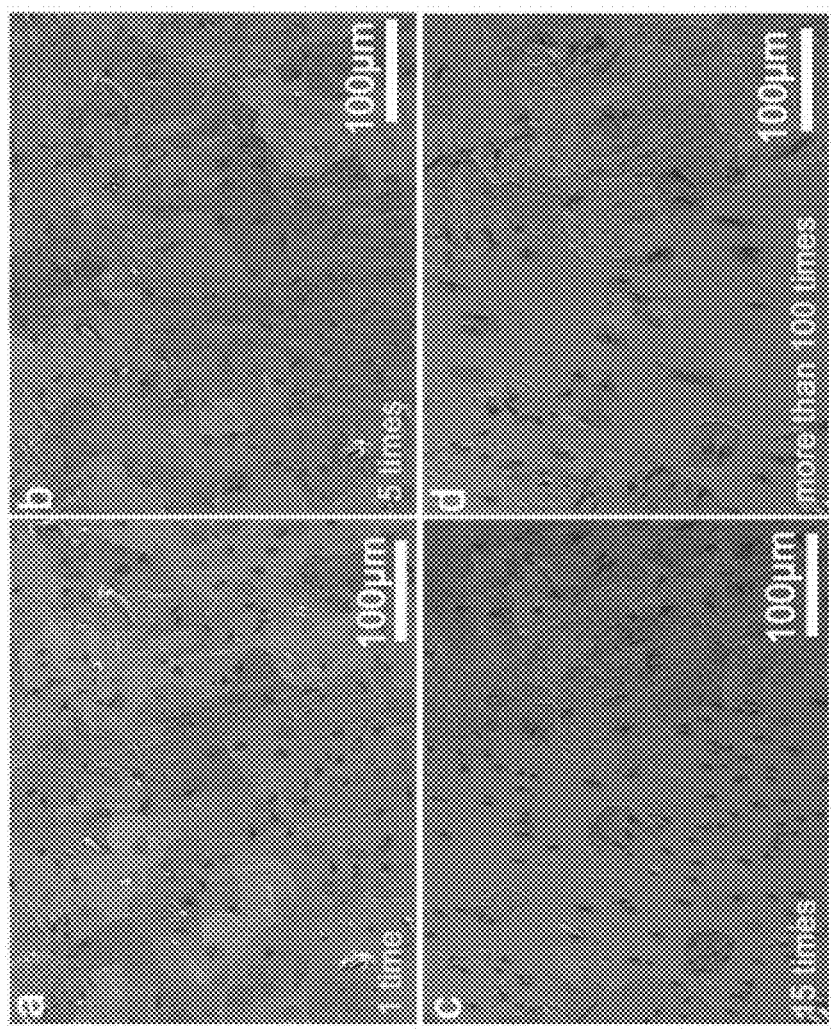
FIG. 6 is an illustration of the topography of the graphene film which is grown on a polycrystalline platinum substrate after the damage-free graphene transfer process, wherein (a-d) are the SEM of the transferred graphene film, which is grown under the same condition, at the same location after processing 1 time, 5 times, 15 times and more than 100 times of the damage-free transfer method of the present invention respectively.

Referring to FIG. 6 of the drawings, (a-d) are the SEM of the transferred graphene film, which is grown under the same condition, on the same location on the polycrystalline platinum after processing 1 time, 5 times, 15 times and more than 100 times of the damage-free transfer method of the present invention respectively. FIG. 6 shows no significant changes on the structure of the graphene, which indicates that the substrate can be used repeatedly after the transfer process of the present invention.

According to the SEM of the transferred graphene film grown on the polycrystalline platinum, after damage-free transfer for 1 time, 5 times, 15 times and more than 100 times by the damage-free transfer method of the present invention, no significant changes on the structure of the graphene film which is grown on the platinum substrate is observed. This proves that the substrate can be used repeatedly after the transfer process of the present invention.

Figure 7:
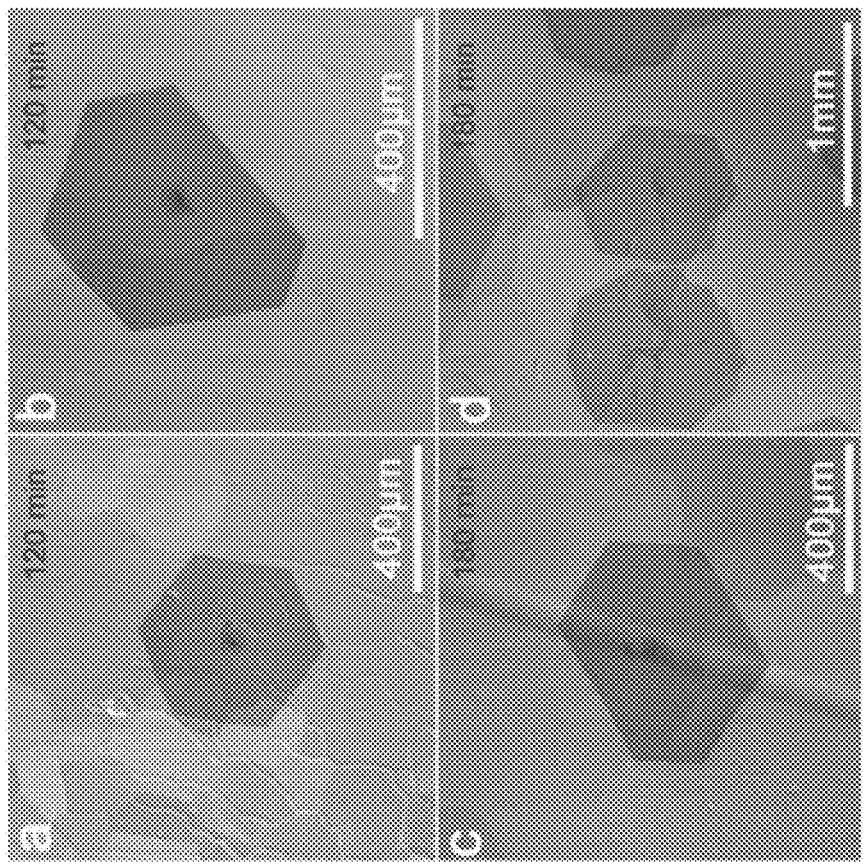
FIG. 7 is an illustration of the feature of the monocrystalline graphene island which is grown on a polycrystalline platinum substrate after the damage-free graphene transfer process, wherein (a-b) are the SEM of the graphene after growing for 120 minutes respectively and (c-d) are the SEM of the graphene after growing for 180 minutes respectively. According to FIG. 7, after the platinum foil is used repeatedly for many times, the platinum foil can still be used as a substrate and the monocrystalline graphene which is grown on the platinum foil does not show any significant differences. The polycrystalline platinum foil substrate has already been used repeatedly for more than 500 times already.

Referring to FIG. 7 of the drawings, (a-b) are the SEM of the graphene after growing for 120 minutes respectively and (c-d) are the SEM of the graphene after growing for 180 minutes respectively. FIG. 7 shows that after the platinum foil is used repeatedly for many times, the platinum foil can still be used as a substrate and the monocrystalline graphene which is grown on the platinum foil does not show any significant difference while the polycrystalline platinum foil substrate has already been used repeatedly for more than 500 times already. This shows that the structure of the monocrystalline graphene island grown from the substrate which is repeated used does not show any significantly differences from that of the monocrystalline graphene island grown from the initial substrate, and this proves that the substrate can be used repeatedly after the transfer process of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A low-cost and damage-free graphene transfer process, characterized in that, the method utilizes graphene on an initial substrate the method utilizes an initial substrate having a surface on which the graphene is synthesized or coated, wherein the initial substrate is adapted for use as an electrode to undergo an electrolysis process through which gas bubbles are generated on the surface of the initial substrate to provide a combination effect of moving action and intercalation action to separate the graphene on the surface of the initial substrate from the initial substrate without causing any damaging effect on the graphene, wherein the graphene separated from the initial substrate is damage-free and is capable of binding onto a surface of a target substrate, wherein the method comprises the steps of:

(1) coating a transfer medium layer onto the graphene on the surface of the initial substrate in which the transfer medium is coated onto the graphene on the initial substrate defining a composite layer of the transfer medium and the graphene for preventing damage to the graphene in subsequent processing, wherein the graphene is grown or is coated onto the surface of the initial substrate;

(2) separating the composite layer of the transfer medium and the graphene from the initial substrate in which the initial substrate with the composite layer of transfer medium and graphene is placed into an electrolyte solution and is used as an electrode such that gaseous substances is generated on the surface of the initial substrate by an electrolysis process and the composite layer of the transfer medium and the graphene is separated from the initial substrate through the combination effect of moving action and intercalation action of the gaseous substances, therefore the graphene of the composite layer is separated without damages;

(3) binding the composite layer of the transfer medium and the graphene to the target substrate by a direct contact method through placing the composite layer of the transfer medium and the graphene onto the target substrate; and (4) removing the transfer medium by dissolution with solvent or by heating to remove the transfer medium on an outer surface of the graphene.

2. The low-cost and damage-free graphene transfer process according to claim 1, characterized in that, wherein the graphene on the initial substrate is obtained by a method selected from the group consisting of chemical vapor deposition method, epitaxial growth method, precipitation method, mechanical or tape exfoliation method, chemical exfoliation method and graphene assembly method.

3. The low-cost and damage-free graphene transfer process according to claim 1, characterized in that, wherein the transfer medium is a high molecular weight polymer for providing strengthened protection to the graphene such that the graphene is protected from damages during the transfer process, wherein the high molecular weight polymer is selected from one or more from the group consisting of polymethyl methacrylate (PMMA), polyethylene, polystyrene, polypropylene, wherein a thickness of the transfer medium is 1 nm-1 mm.

4. The low-cost and damage-free graphene transfer process according to claim 1, characterized in that, the initial substrate with the composite layer of transfer medium and graphene is an anode or a cathode in the electrolysis process.

5. The low-cost and damage-free graphene transfer process according to claim 1, characterized in that, the initial substrate of the graphene is a metal selecting from the group consisting at least one of Pt, Ni, Cu, Co, Ir, Ru, Au and Ag, a metal alloy conductor selecting from the group consisting at least two of Pt, Ni, Cu, Co, Ir, Ru, Au and Ag, a semiconductor selecting from the group consisting at least one of Si, SiO2 and Al2O3, or a composite materials of two of the metal, the metal alloy conductor and the semi-conductor.

6. The low-cost and damage-free graphene transfer process according to claim 1, characterized in that, the electrolyte solution for the electrolysis process is an acid, base or salt solution containing a single-solute electrolyte, a multi-solute electrolyte, a mixture of single-solute electrolyte and organic substance, or a mixture of multi-solute electrolyte and organic substance, wherein the organic substance is selected from the group consisting of one or more of alkyl, alkenyl, alkynyl, aromatic hydrocarbons, alcohols, aldehydes, carboxylic acids and esters, wherein the electrolyte solution is selected under a condition that no chemical or electrochemical reaction is occurred between the electrolyte solution and the initial substrate.

7. The low-cost and damage-free graphene transfer process according to claim 1, characterized in that, a concentration of the electrolyte solution is 0.01 mol/L~10 mol/L, and a temperature is −10° C.~100° C., a voltage of 1100 volt and a current of 0.01~100 ampere for the electrolysis process.

8. The low-cost and damage-free graphene transfer process according to claim 1, characterized in that, if the transfer medium is a high molecular weight polymer and is removed by an organic solvent through dissolution, the organic solvent is selected from one or more of the group consisting of ketones, chlorinated hydrocarbons, halogenated hydrocarbons and aromatic hydrocarbons reagent and a dissolution temperature is 0~200° C.; and if the transfer medium is a high molecular weight polymer and is removed by heating, a heating temperature is 50~600° C.

9. The low-cost and damage-free graphene transfer process according to claim 1, characterized in that, the target substrate is a metal conductor selected from the group consisting of Pt, Ni, Cu, Co, Ir, Ru, Au and Ag, a semi-conductor selected from the group consisting of Si, BN, $SiO_2$ and $Al_2O_3$, an insulator selected from the group consisting of glass and quartz, or a high molecular weight polymer of polyethylene terephthalate, wherein the target substrate has a shape comprising a flat surface structure, a curved surface structure or a mesh structure.

* * * * *